3,042,559
PROPELLANTS
Henry B. Hass, West Lafayette, Ind., assignor to Purdue Research Foundation, West Lafayette, Ind., a corporation of Indiana
No Drawing. Filed June 1, 1948, Ser. No. 30,513
10 Claims. (Cl. 149—47)

The present invention relates to solid propellants and is more particularly concerned with such compositions which are more suitable for use in rocket or similar jet-type motors than previously known compositions.

Many exacting specifications must be met by a solid fuel adapted for use in jet-type motors. Among these important requirements is that of proper oxygen balance. This may be calculated for a compound or composition according to the equation:

$$\frac{O_A \times 100}{O_R} - 100 = \text{oxygen balance}$$

where $O_A$ is the number of oxygen atoms available and $O_R$ is the number of oxygen atoms required for complete combustion, i.e., to burn all the carbon atoms to carbon dioxide and all the hydrogen to water. A compound is considered in perfect balance when this situation exists and the oxygen balance is zero. A compound having a minimum oxygen balance of approximately minus 50 is considered substantially smokeless. Likewise, a composition having a minimum oxygen balance of minus 80 has been shown by test and experience to be satisfactorily smokeless for all practical purposes, any greater negativity value, however, being indicative of excessive smoke production and decreased thrust per fuel weight. Propellants having a greater negative oxygen balance value are generally excessively smoke-producing and inefficient and their employment for this and other reasons is undesirable.

It has previously been proposed to use various compositions as solid propellants. These compositions have comprised, for example, mixtures of ethyl cellulose or cellulose nitrate, alone or with nitroglycerine or ethylene glycol dinitrate, and an oxidizer such as sodium nitrate, ammonium nitrate, ammonium picrate, potassium perchlorate, and the like. Suitable binders, such as peptized rubber, fillers such as charcoal, and stabilizers such as diphenylamine or diethyldiphenylurea, have also been incorporated into such compositions. Such mixtures of cellulose compounds with an oxidizer with or without fillers, binders, or stabilizers are herein referred to as "powder-bases." However, serious disadvantages have attended the employment of such compositions as propellants. Either the oxygen balance is not within the proper range so that incomplete combustion occurs, or the combustion of various of the ingredients invariably leads to the production of dense white smoke. Either of the above disadvantages makes use of the composition undesirable, since production of smoke limits visibility to a hazardous extent and makes the path of the propelled vehicle obvious, while incomplete combustion due to inadequate oxygen balance allows combustible material to go off in the exhaust gases. Therefore, it would be desirable to incorporate with such mixtures a compound having a suitable oxygen balance to bring up the total oxygen balance and provide an increase in thrust capacity of the fuel.

Other propellant compositions have comprised polymeric compounds, such as styrene-linear polyesters, styrene-maleic anhydride plastics, phenol-furfural resins, et cetera, together with oxidizers. While these have been more acceptable from several standpoints, they also suffer from the same serious disadvantages mentioned above. This type of propellant is herein referred to as a "plastic-base" propellant.

It has also been proposed to use "nitro plastic" materials as the major thrust-producing component of solid propellants. While these may be in satisfactory oxygen balance, either alone or when admixed with suitable oxidizers, it is desirable to add as a plasticizer or filler to such resins a further compound or composition to provide an additional source of thrust and to increase further the desirable oxygen balance. Such nitro plastics as may thus be employed with or without added oxidizers are polyvinyl acetals of trinitrobenzaldehyde, nitrofurfurals, 2,3,3-trinitropropanal and the like.

It is an object of the present invention to provide improved propellant compositions having a more suitable oxygen balance, and productive of greater thrust per unit weight than previously known propellant compositions. Another object is the provision of improved "powder-base," "plastic-base" and "nitro plastic" propellant compositions having incorporated therewith as additive, filler, or plasticizer, a polynitro paraffin. Other objects of the invention will become apparent hereinafter.

It has now been found that polynitro paraffins may be advantageously employed in conjunction with known propellant compositions, such as comprise, for example, ethyl cellulose+binder+inorganic oxidizer, styrene resin+inorganic oxidizer, inorganic oxidizer+peptized rubber binder, double base powder+charcoal+inorganic oxidizer, phenol-furfural resins+oxidizer, polyvinyl alcohol-nitro aldehyde resins, cellulose nitrate+nitroglycerine+stabilizer, neoprene casting cement+inorganic oxidizer, ethyl cellulose-castor oil+inorganic oxidizer, and other styrene-linear polyester resins+inorganic oxidizer compositions. The polynitro paraffins may be used in conjunction with conventional "powder-base" compositions, "plastic-base" compositions, or "nitro plastic" propellants.

Any polynitro paraffin having the requisite oxygen balance is suitable for the intended use. Preferably, when used in conjunction with nitrates, the polynitro paraffin is of a non-acidic nature. Such polynitro paraffins do not possess a

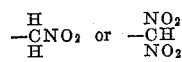

grouping in the molecule, the hydrogen atom in these groupings being acidic. Representative polynitro alkanes which are suitable for the intended use are trinitromethane, tetranitromethane, 2,2-dinitropropane, 2,3,3-trinitrobutane, 2,2,3,3-tetranitrobutane, 2,3,3-trinitroisopentane, 2,2,4,4-tetranitropentane, 2,2,5,5-tetranitrohexane, 2-methyl-2,3,3-trinitropentane, 2,2,6,6-tetranitroheptane, 2,2,4,4-tetranitro-3,3-dimethylpentane, and the like. The non-acidity feature is of importance only when the polynitro paraffin is used in conjunction with a composition or compound containing the relatively unstable O—NO$_2$ grouping, such as is present in a cellulose trinitrate composition. Mononitro paraffins which fall within the prescribed range of oxygen balance are unsuited fore use because of undue volatility and instability.

Polynitro paraffins and methods for their preparation are known in the art. For example, generally applicable procedure for their preparation is found in Organic Synthesis, volume 21, John Wiley and Sons (1941), at page 105. Other generally applicable procedure is that of J. Meitner (paper presented at Am. Chem. Soc. meeting for April 1946) or Jacobson, doctorate thesis (Purdue University, 1942). The preparation of 2,2-dinitropropane, for example, may be accomplished from 2-nitropropane by nitrosation with nitrosyl chloride and subsequent oxidation to the desired product. Alternatively, the nitrosation step may employ nitrous acid. Still other procedures are those of Victor Meyer, the addition of nitrogen tetroxide to a double bond, and vapor-phase nitration, procedure for all of which is well-known in the art.

The reaction of concentrated or fuming nitric acid, with or without the presence of concentrated sulfuric acid, is usually a satisfactory manner of preparing the compounds of simpler type of structure.

It is to be noted that the oxygen balance of these nitro paraffins is highly desirable for their incorporation into propellant compositions. For example, tetranitromethane has an oxygen balance of +300, and only a very small amount of this polynitro paraffin need be incorporated in the propellant composition to aid greatly the oxygen balance thereof. 2,2-dinitropropane has an oxygen balance of minus 55.6, trinitrobutane (Beilstein I, p. 149) has an oxygen balance of minus 47.8, tetranitrobutane has an oxygen balance of minus 27.3, and many other polynitro paraffins likewise have this desirable property. Polynitro paraffins having an oxygen balance of greater negativity value than minus 80 are generally not satisfactory for the prescribed use, as it is not practical to bring the oxygen balance of a propellant composition nearer to or into the desired range with an additive, filler, or plasticizer which is itself not within the desired range of oxygen balance.

The polynitro paraffin may be readily incorporated into any of the conventional types of propellants. For example, it may be simply admixed with a major proportion of a powder-base type composition. Alternatively, they may be mixed in an organic medium and the medium thereafter evaporated. With the plastic-type compositions, it is necessary only to admix the polynitro paraffin and polymeric material before thermo-setting occurs, and then, if desired, to set the resin, the polynitro paraffin acting as a filler, or, in some cases, as a plasticizer. With the nitro plastic compositions, the same procedure may be used as for the plastic-base type propellants. Variations of the above three types of propellants are known, and, for example, cellulose nitrate and 2,2-dinitropropane may both be incorporated with an unsaturated polymer such as a butadiene Hycar rubber. Likewise, a polynitro paraffin and a cellulose nitrate or an inorganic oxidizer may be incorporated into phenol-furfural resins. Styrene may also be polymerized, using boron trifluoride or other suitable catalyst in the presence of polynitro paraffins, oxidizers such as ammonium picrate, ammonium perchlorate, ammonium nitrate, ethylene glycol dinitrate, or nitroglycerol also being incorporated into the composition if desired. Generally speaking, it is only necessary that a polynitro paraffin having the prescribed characteristics be incorporated into the propellant composition as an additive, filler or plasticizer, and the exact manner of incorporation is of secondary importance, many modes of accomplishing this result being apparent to one skilled in the art.

Procedure for calculating burning-law exponents or temperature coefficients is known (Crawford and Huggett, O.S.R.D. Report 5577, p. 52). This procedure allows the indirect evaluation of the temperature coefficient of a fuel by the experimental measurement of burning-rate change with respect to pressure. Assuming that the Paul Vielle equation proposed by the French physicist in 1893 holds, $$r = cP^n$$

where $r$ is the linear burning rate of a powder, $c$ and $n$ are constants for a certain composition, and $P$ is gas pressure.

It follows that:

$$\frac{d \log r}{d \log P} = n$$

and $n$ may therefore be determined by estimating the slope of the straight line obtained by plotting $\log r$ against $\log P$.

Desirable temperature coefficients are indicated by low values of $n$, as indicated by the relation $$\left(\frac{d \log P}{dT}\right)_K = \frac{1}{1-n}\left(\frac{d \log r}{dT}\right)_P$$

where T equals absolute temperature and $$K = \frac{\text{area of burning surface of propellant}}{\text{cross-sectional area of throat}}$$

As noted from Examples 5, 6, and 7, compositions of the present invention embodying polymeric nitro acetals exhibit very low temperature coefficients, evidenced by low values of $n$, which are generally below 0.60. Burning rate determinations in a Crawford bomb, such as those disclosed herein, accurately parallel data obtained by actual firing of the propellant charges in midget motors.

The following examples are illustrative only and are in no way to be construed as limiting.

*Example 1*

A suspension of 0.80 mole (70.4 grams) of high viscosity polyvinyl alcohol (45–55 cps.) in 600 milliliters of glacial acetic acid was treated with one mole (241 grams) of 2,4,6-trinitrobenzaldehyde dissolved in 1000 milliliters of glacial acetic acid. An acid catalyst, consisting of 20 milliliters of concentrated hydrochloric acid diluted with twenty milliliters of water, was added with stirring and the reaction continued for 65 hours, while the reaction temperature was maintained at about 60 degrees centigrade. At the end of the reaction time the transparent solution was dropped into about ten gallons of water with vigorous stirring. The precipitated fibrous nitro acetal was filtered, washed with one percent solution of sodium carbonate and then with water. The nitro acetal resin was obtained in a yield of about 80 percent and found to be yellow in color, combustible, and to have a softening point of 85 degrees centigrade.

The polynitro acetal plasticized or mixed readily with tetranitromethane, dinitropropane, and other polynitro paraffins and methyl nitro acetate.

*Example 2*

(a) A suspension of 0.2 mole (17.6 grams) of high viscosity polyvinyl alcohol in 200 milliliters of glacial acetic acid was treated with 0.2 mole (48.60 grams) of 5-nitrofurfural diacetate in the presence of eight milliliters of six-N-hydrochloric acid. The mixture was stirred mechanically for 120 hours at 60 degrees centigrade. The clear brown solution was then added dropwise to about two gallons of water with vigorous stirring. The precipitate was washed with a two percent solution of sodium carbonate and then with water. The dried, white polymer burned readily in air and had a softening point of about 125 degrees centigrade.

(b) A 500-milliliter round-bottom three-neck flask, equipped with a stirrer, was charged with 200 milliliters of glacial acetic acid containing 0.2 mole (48.6 grams) of 5-nitrofurfural diacetate. After adding eight milliliters of six-N hydrochloric acid and 0.2 mole of high viscosity polyvinyl alcohol which had been emulsified in 150 milliliters of glacial acetic acid, the contents of the flask were maintained at 57 degrees centigrade for 23 hours. At the end of this time the polyvinyl alcohol had completely dissolved. The solution was added dropwise into about ten liters of water with vigorous stirring. The solid product, which immediately formed, consisted of small white balls. The precipitate was washed with two percent sodium carbonate solution, then with water, and dried in an oven at 65 degrees centigrade. The dried product burned readily in air. The product weighed 34 grams, representing about 81 percent of the theoretical yield. The polymer did not liquefy under 200 degrees centigrade with slow rise in temperature. Plasticization was accomplished with tetranitromethane and 2,2-dinitropropane.

Example 3

Twenty grams of the dipotassium salt of 2,3,3-trinitropropanal was added slowly to 100 milliliters of glacial acetic acid. The mixture was placed in a round-bottom three-neck flask fitted with a thermometer and a stirrer and 4.4 grams of polyvinyl alcohol suspended in 100 milliliters of glacial acetic acid added thereto. The solution was heated to 90 degrees centigrade and refluxed for 48 hours, whereupon the mixture became viscous and was poured into cold water, washed and separated. The nitro acetal which was obtained in this manner burned with an almost smokeless flame, and plasticized or formed intimate admixtures with tetranitromethane, 2,2-dinitropropane, other polynitro paraffins and methyl or ethyl nitroacetate.

Example 4

Fourteen and seventy-six one-hundredths grams of the polyvinyl acetal of 2,4,6-trinitrobenzaldehyde and 9.84 grams of dried ammonium nitrate (with 0.1 percent calcium phosphate added) were subjected to tumbling in a ball mill containing 250 grams of stone balls. After 24 hours of blending in the mill, the powdered mixture was plasticized with 3.63 grams of methyl nitroacetate and rolled into a strand, the composition of which was as follows:

|  | Percent |
| --- | --- |
| Nitroacetal | 52.25 |
| Ammonium nitrate | 34.83 |
| Methyl nitroacetate | 12.92 |

The strand was placed on a glass plate at room temperature (27 degrees centigrade) to determine weight increase (hygroscopicity) or weight loss (volatility of methyl nitroacetate). The weight of the sample and the uniform texture thereof did not change over a period of one month.

Example 5

Sufficient tetranitromethane is added to the desired quantity of pulverized nitro acetal to yield a mixture containing 28 percent tetranitromethane. If the mixing is done by hand with a steel spatula, about 40 grams of the nitro acetal worked on a 10 x 10 inch glass plate is convenient. This amount will require 16 grams of tetranitromethane, which is quickly absorbed by the plastic, and the mixture is finally kneaded with the fingers. A stiff, brown, doughy mass results, which is shaped by rolling on a plate to form strands of whatever length and diameter may be desired.

Forty grams of ball-milled polyvinyl acetal of 2,4,6-trinitrobenzaldehyde and sixteen grams of dried ammonium nitrate (0.1 percent calcium phosphate added) were tumbled in the ball mill used in Example 4. After 24 hours of blending, the powdered mixture was mixed with tetranitromethane (20.6 grams, of which 6.7 grams volatilized during mixing) and then shaped into strands. The strands were coated with Glyptal enamel and air-dried before burning in a Crawford bomb.

Measurement of the burning rate of the strands, containing 57 percent nitro acetal, 23 percent ammonium nitrate, and 20 percent tetranitromethane gave the following data:

| Initial pressure, p.s.i. | Peak pressure, p.s.i. | Burning Rate, Inches/Second |
| --- | --- | --- |
| 700 | 745 | 0.30 |
| 1,000 | 1,065 | 0.36 |
| 1,000 | 1,040 | 0.39 |
| 1,380 | 1,450 | 0.42 |
| 1,460 | 1,560 | 0.50 |
| 1,700 | 1,780 | 0.50 |

When graphed, the value of the slope $n$, using the method of least squares, was found to be 0.57, which is a very low burning-law exponent.

Example 6

Burning rate determinations were conducted with strands of (a) polyvinyl acetal of 2,4,6-trinitrobenzaldehyde plasticized with 28 percent tetranitromethane and (b) 75 percent potassium perchlorate-25% peptized rubber. The strands were coated with Glyptal enamel before determinations in a Crawford bomb. The results were as follows.

Composition (a):

| Initial pressure, p.s.i. | Peak pressure, p.s.i. | Burning Rate, Inches/Second |
| --- | --- | --- |
| 500 | 560 | 0.35 |
| 500 | 550 | 0.28 |
| 1,000 | 1,080 | 0.37 |
| 1,000 | 1,070 | 0.37 |
| 1,000 | 1,080 | 0.37 |
| 1,500 | 1,600 | 0.44 |
| 1,500 | 1,600 | 0.44 |

The burning-law exponent $n$ for this composition was 0.36, a very low value.

Composition (b):

| Initial pressure, p.s.i. | Peak pressure, p.s.i. | Burning Rate, Inches/Second |
| --- | --- | --- |
| 500 | 550 | 0.66 |
| 500 | 540 | 0.56 |
| 1,000 | 1,120 | 1.03 |
| 1,500 | 1,640 | 1.33 |

The burning-law exponent for composition (b) was $n = 0.74$.

Example 7

In a burning rate experiment similar to that of Example 6, a strand of 72 percent polyvinyl acetal of 2,4,6-trinitrobenzaldehyde and 28 percent tetranitromethane composition, coated with Glyptal enamel, exhibited a burning-law exponent of 0.32.

Example 8

A composition comprising approximately 90 percent of (a) ninety percent ammonium picrate+ten percent potassium nitrate mixture and 10 percent of (b) ethyl cellulose+arochlor (chlorinated biphenyl) binder, is intimately admixed with a minor proportion of tetranitromethane. The oxygen balance and burning rate exponent are considerably improved, and the thrust capacity per unit fuel weight is increased considerably.

Example 9

A composition comprising a base of 60 percent of cellulose nitrate (13 percent nitrogen)+40 percent glyceryl trinitrate base with one percent of stabilizer (diphenylamine or sym-diethyldiphenylurea), potassium perchlorate and charcoal is intimately admixed with a minor proportion of tetranitromethane or 2,2-dinitropropane. The resulting composition has a better oxygen balance, produces less smoke upon burning, and has greater thrust capacity per unit of fuel weight.

Example 10

A composition comprising approximately 47 percent of ammonium nitrate, 40 percent ammonium picrate, and 13 percent of a broken-down or peptized rubber binder is intimately admixed with a minor proportion of tetranitromethane. The resulting composition has a considerably improved oxygen balance, produces less smoke upon burning, and has greater thrust capacity per unit fuel weight. In addition, the burning rate of the composition is less sensitive to variation in pressure and temperature.

Example 11

Monomeric styrene is polymerized in the presence of 2,2-dinitropropane using a boron trifluoride catalyst. Additional compositions which may be embodied in the polymer are ammonium picrate, ammonium nitrate, ammonium perchlorate, ethylene glycol dinitrate, and glyceryl trinitrate. The resulting polymers are suitable for use as propellants, being in good oxygen balance and producing less smoke upon burning than ordinary propellant compositions.

Example 12

2,2-dinitropropane is incorporated into a butadiene copolymer (Hycar OR 25) together with cellulose nitrate. Additional compositions which may be embodied in the polymer are ammonium picrate, ammonium nitrate, ammonium perchlorate, ethylene glycol dinitrate, and glyceryl trinitrate. The resulting compositions are in good oxygen balance and suitable for use as a propellant, exhibiting a low burning-rate exponent.

Example 13

2,2-dinitropropane (70 percent by weight) was incorporated into a phenol-furfural resin (30 percent by weight). The polynitro paraffin is compatible with the resin over a wide range of proportions. Additional compositions which may be embodied in the polymer are ammonium picrate, ammonium nitrate, ammonium perchlorate, ethylene glycol dinitrate, cyclonite, and glyceryl trinitrate. Upon curing the mixture, with or without added oxidizers, to a thermosetting resin, a composition having a good oxygen balance and good burning rate-pressure characteristics is produced.

A typical composition which was prepared is as follows:

25 parts phenol-furfural resin
15 parts 2,2-dinitropropane
40 parts ammonium perchlorate
20 parts ethylene glycol dinitrate

Example 14

Other compositions were prepared using cellulose nitrate (13.5 percent nitrogen) as a base. Mixtures were made with 2-methyl-2,3,3-trinitrobutane and with 2-methyl-2,3,3-trinitropentane. The table below shows the mixtures which were prepared, all percentages given being by weight. CN, TNP, and TNH represent cellulose nitrate (13.5 percent nitrogen), trinitropentane, and trinitrohexane, respectively.

| No. | Percent CN | Percent TNP | Percent TNH |
|---|---|---|---|
| 1 | 50 | 50 | |
| 2 | 67 | 33 | |
| 3 | 75 | 25 | |
| 4 | 67 | | 33 |
| 5 | 50 | 25 | 25 |
| 6 | 67 | 16½ | 16½ |

All samples burned without ash. Those mixtures containing 50–50 percentages of the trinitro compound were somewhat less desirable as to strength of grain. As the amount of the trinitro compounds was decreased, as in 2, 3, 4, and 6, stronger films were obtained. The compounds were all in good oxygen balance, and could be modified by incorporation of other polynitro paraffins or oxidizers thereinto.

Example 15

One, two, three, and four grams of cellulose nitrate (11.2 percent nitrogen) was dissolved in ten-milliliter portions of acetone with one gram of 2-methyl-2,3,3-trinitrobutane and the solvent allowed to evaporate at room temperature. All samples burned without smoking and left only a little ash.

The experiment was repeated using a solvent made from fifty-eight parts of ethyl ether, twenty-nine parts of absolute ethanol, and thirteen parts of acetone. Twenty grams of cellulose nitrate was dissolved in 100 milliliters of this solvent.

Two, one, and one-half grams of 2-methyl-2,3,3-trinitrobutane was added to ten-milliliter portions of this mixture and the solvent allowed to evaporate. The mixtures obtained were the same as when acetone was used alone, exhibiting excellent burning characteristics.

In place of a polynitro paraffin, it has been found that an ester of nitroacetic acid, having the proper oxygen balance, may also be employed. Such compounds are, for example, methyl and ethyl nitroacetates. The esters, as well as methods for the preparation thereof, are known in the art.

Various modifications may be made in the invention without departing from the spirit or scope thereof and it is to be understood that I limit myself only as defined by the appended claims.

I claim:

1. A solid propellant composition comprising: an acetal of polyvinyl alcohol with a nitroaldehyde, said acetal having an oxygen balance of from zero to minus 80, said acetal being the major thrust-producing component of the said propellant, and, incorporated therewith, a compound selected from the group consisting of polynitro paraffins and lower-alkyl esters of nitroacetic acid in amount up to about 28 percent of the total propellant mass.

2. A solid propellant composition comprising: the polyvinyl acetal of 2,4,6-trinitrobenzaldehyde incorporated with a compound selected from the group consisting of polynitro paraffins and lower-alkyl esters of nitroacetic acid in an amount up to about 28 percent of the total propellant mass.

3. A solid propellant composition comprising: the polyvinyl acetal of 2,4,6-trinitrobenzaldehyde and incorporated therewith, tetranitromethane in amount up to about 28 percent of the total propellant mass.

4. A solid propellant composition comprising: about seventy-two percent of a polyvinyl acetal of 2,4,6-trinitrobenzaldehyde and about twenty-eight percent of tetranitromethane.

5. The composition of claim 1, wherein the nitro acetal is a polyvinyl acetal of 5-nitrofurfural.

6. The composition of claim 1, wherein the nitro acetal is a polyvinyl acetal of 2,3,3-trinitropropanal.

7. A solid propellant composition comprising: an acetal of polyvinyl alcohol with a nitroaldehyde, said acetal having an oxygen balance of from zero to minus eighty, said acetal being the major thrust-producing component of the said propellant, and, incorporated therewith, an inorganic oxidizer up to about 35 percent of the total propellant mass, and a compound selected from the group consisting of polynitro paraffins and lower-alkyl esters of nitroacetic acid in an amount up to about 28 percent of the total propellant mass.

8. The composition of claim 7, wherein the inorganic oxidizer is ammonium nitrate.

9. A solid propellant composition comprising: the polyvinyl acetal of 2,4,6-trinitrobenzaldehyde incorporated with up to about 35 percent of the total propellant mass of an inorganic oxidizer, and a compound selected from the group consisting of polynitro paraffins and lower-alkyl esters of nitroacetic acid in an amount up to about 28 percent of the total propellant mass.

10. The composition of claim 9, wherein the inorganic oxidizer is ammonium nitrate.

(References on following page)

References Cited in the file of this patent

UNITED STATES PATENTS

| | | |
|---|---|---|
| 914,624 | Winand | Mar. 9, 1909 |
| 1,632,959 | Gartner | June 21, 1927 |
| 1,985,968 | Wyler | Jan. 1, 1935 |
| 2,160,133 | Ellis | May 30, 1939 |
| 2,325,064 | Lawrence | July 27, 1943 |
| 2,338,120 | Lawrence | Jan. 4, 1944 |
| 2,344,840 | Watt et al. | Mar. 21, 1944 |
| 2,388,846 | Hecht | Nov. 13, 1945 |
| 2,400,806 | Bruson | May 21, 1946 |
| 2,404,688 | Bruson | July 23, 1946 |
| 2,407,131 | Bruson | Apr. 15, 1947 |
| 2,419,043 | Urbanski | Apr. 15, 1947 |

FOREIGN PATENTS

| | | |
|---|---|---|
| 24,839 | Great Britain | 1913 |
| 201,907 | Germany | Jan. 20, 1907 |
| 277,594 | Germany | Aug. 23, 1913 |